United States Patent Office 3,509,200
Patented Apr. 28, 1970

3,509,200
INDANYL THIOCARBAMATES
Bill Elpern, White Plains, and Joshua B. Youlus, Monsey, N.Y., assignors to USV Pharmaceutical Corporation, a corporation of Delaware
No Drawing. Filed June 6, 1967, Ser. No. 643,824
Int. Cl. C07c *155/08;* A61k *9/06;* C07d *13/10*
U.S. Cl. 260—455                                    2 Claims

ABSTRACT OF THE DISCLOSURE

Compounds of the formula

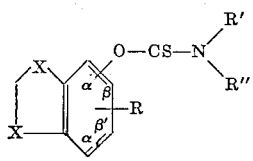

wherein X is O or $CH_2$, R is hydrogen, allyl, lower alkyl, halogen, or lower alkoxy, R' is hydrogen, allyl or lower alkyl and R'' is adamantyl or

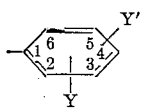

wherein Y and Y' are hydrogen, allyl, lower alkyl, halogen or lower alkoxy and may be the same or different, are active antifungal compounds. Preferably, X is $CH_2$, R is hydrogen, R' is methyl, R'' is m-tolyl, and the —O—CS—N(R')R'' is in the β-position.

---

This invention relates to new organic compounds having valuable pharmaceutical actitvity and to a process for the preparation of said compounds.

In particular, the invention relates to thioacarbamates having the structure

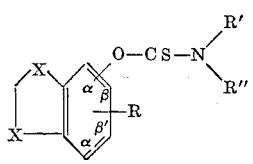

wherein X is O or $CH_2$, R is hydrogen, allyl, lower alkyl, lower alkoxy or halogen, R' is hydrogen, allyl or lower alkyl, and R'' is adamantyl or

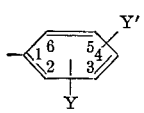

wherein Y and Y' are hydrogen, allyl, lower alkyl, lower alkoxy or halogen and may be the same or different. The lower alkyl groups contain up to 5 carbon atoms and may be methyl, ethyl, isopropyl, butyl, secbutyl, amyl, isoamyl and the like. The lower alkoxy groups also contain up to 5 carbons and may be methoxy, ethoxy, isopropoxy, butoxy, and the like.

Preferably X is $CH_2$, R is hydrogen, R' is methyl, R'' is m-tolyl, and the —O—CS—N(R')R'' group is in the beta position.

According to the process of this invention the compounds are prepared by the reaction in the presence of an alkaline substance of an amine of the formula

with a thionochloroformate of the formula

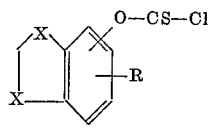

wherein X, R, R', and R'' are the same as above. Suitable alkaline substances for use in the reaction include sodium or potassium hydroxide, sodium carbonate, sodium bicarbonate, pyridine, triethylamine, and N-methylmorpholine. The reaction is preferably carried out by heating in an inert solvent. The thionochloroformates are readily obtained by the reaction of thiophosgene with a phenol of the desired structure.

The compounds of this invention have strong topical antifungal activity and may be administered topically in the form of ointments and solutions.

The invention will be more fully understood from the examples which follow, and it is intended to cover all changes and modifications of the examples of the invention herein chosen for purposes of disclosure which do not depart from the spirit and scope of the invention.

EXAMPLE I

O-(5-indanyl)-m,N-dimethyl-thionocarbanilate 9.7 g. N-methyl-m-toluidine and 6.7 g. $NaHCO_3$ were added to 80 ml. acetone. 17 g. 5-idanyl-thionochoroformate was added to the resulting mixture at about 0°–10° C. The mixture was refluxed for about 15 minutes, cooled and poured into 160 cc. water. The solid which precipitated was recrystallized and melted at 94–95° C.

Following the procedure in Example I, the following compounds were prepared (all substituted in the β-position, except compound F which was substituted in the α-position):

| | X | R | R' | R'' | M.P. (deg.) |
|---|---|---|---|---|---|
| A | CH₂ | B'—Br | CH₃ | ![benzene with CH₃] | 97–100 |
| B | CH₂ | H | CH₃ | ![benzene with Cl] | 114–115 |
| C | CH₂ | H | CH₃ | ![benzene with 2 Cl] | 135–137 |
| D | O | H | CH₃ | ![benzene with CH₃] | 100–102 |
| E | CH₂ | H | H | adamantyl | 178–180 |
| F | CH₂ | H | CH₃ | ![benzene with CH₃] | 90–91 |

EXAMPLE II

An ointment cream suitable for topical administration was prepared by mixing thoroughly the following ingredients:

| | G. |
|---|---|
| O-(5-Indanyl)-m,N-dimethylthionocarbanilate | 10 |
| Butylated hydroxyanisole | 5 |
| Polyethylene glycol 400 | 454 |
| Propylene glycol | 500 |
| Carboxypolymethylene | 18 |
| Triethylamine | 3 |
| Titanium dioxide | 10 |

Each gram of the ointment cream contained 10 mg. of the active ingredient.

EXAMPLE III

A nonaqueous solution suitable for topical administration was prepared by dissolving 10 g. of O-(5-indanyl)-m,N-dimethyl-thionocarbanilate in 800 ml. propylene glycol. 1 g. of butylated hydroxytoluene was added, and the solution brought to 1000 ml. by the addition of propylene glycol. The resulting clear, homogeneous solution had a concentration of 1% of the active ingredient.

Compounds of the formula Ar'—O—CS—N(R)—Ar wherein Ar and Rr' are aryl and R is alkyl have been disclosed as possessing anti-fungal activity (French Patent No. 1,337,797). Preferably, R is methyl, Ar is m-tolyl, and Ar' is β-naphthyl (Noguchi et al., Antimicrobial Agents and Chemothereapy, 1962, 259. The replacement of the β-naphthyl group by other aryl groups resulted in a great loss of activity, so the high activity obtained when we replaced the naphthalene by an indan or a benzodioxan was unexpected.

We claim:
1. A compound having the structure

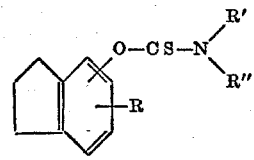

wherein
R is hydrogen, allyl lower alkyl, lower alkoxy, or bromine,
R' is hydrogen, allyl, or lower alkyl, and
R'' is adamantyl or

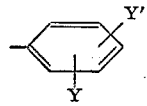

wherein Y and Y' are hydrogen lower alkyl, lower alkoxy, or chlorine, and may be the same or different.

2. A compound according to claim 1, wherein the —O—CS—N(R')R'' group is in the beta position, and R is hydrogen, R' is methyl, and R'' is

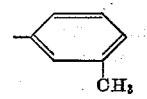

References Cited

UNITED STATES PATENTS 2,901,499  8/1959  Tilles et al. _____ 260—455

OTHER REFERENCES

Reid: "Chemistry of Bivalent Sulfur," vol. IV (1962), pp. 203–204.

Japan Soda Co.: "Chem. Abstracts," vol. 63 (1965), p. 4227.

CHARLES B. PARKER, Primary Examiner

D. R. PHILLIPS, Assistant Examiner

U.S. Cl. X.R.

260—340.5; 424—278, 300